United States Patent
Nakai et al.

(10) Patent No.: US 7,347,071 B2
(45) Date of Patent: Mar. 25, 2008

(54) VEHICLE PROVIDED WITH KEY CYLINDER DEVICE EQUIPPED WITH HANDLE LOCK MECHANISM

(75) Inventors: Shin Nakai, Saitama (JP); Susumu Michisaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 10/923,863

(22) Filed: Aug. 24, 2004

(65) Prior Publication Data

US 2005/0081580 A1  Apr. 21, 2005

(30) Foreign Application Priority Data

Aug. 29, 2003 (JP) ............... 2003-209733

(51) Int. Cl.
*B60R 25/02* (2006.01)
(52) U.S. Cl. ............... 70/186; 70/233; 70/423; 70/454
(58) Field of Classification Search .......... 70/182–186, 70/233, 423, 424, 427, 428, 454
See application file for complete search history.

(56) References Cited

U.S. PATENT DOCUMENTS

| | | | | | |
|---|---|---|---|---|---|
| 585,054 A | * | 6/1897 | Stevens | .................. | 70/233 |
| 1,076,835 A | * | 10/1913 | Lyons | .................. | 70/182 |
| 1,459,584 A | * | 6/1923 | Ericsson | .................. | 70/233 |
| 1,460,015 A | * | 6/1923 | Cappellari | .................. | 70/309 |
| 1,736,900 A | * | 11/1929 | Carpenter | .................. | 70/185 |
| 2,032,821 A | * | 3/1936 | Waits | .................. | 70/185 |
| 2,036,541 A | * | 4/1936 | Ringseis | .................. | 70/454 |
| 2,576,773 A | * | 11/1951 | Buxton | .................. | 70/185 |
| 3,863,472 A | * | 2/1975 | Klingfus | .................. | 70/186 |
| 4,055,060 A | * | 10/1977 | Bellino | .................. | 70/234 |
| 4,232,537 A | * | 11/1980 | Plaiss | .................. | 70/233 |
| 4,490,998 A | * | 1/1985 | Wellekens | .................. | 70/419 |
| 5,718,137 A | * | 2/1998 | Huston | .................. | 70/423 |
| 6,058,752 A | * | 5/2000 | Feder | .................. | 70/419 |
| 6,076,381 A | * | 6/2000 | Green | .................. | 70/186 |
| 6,497,300 B2 | * | 12/2002 | Mori et al. | .................. | 180/219 |

FOREIGN PATENT DOCUMENTS

JP  11-44132 A  2/1999

* cited by examiner

*Primary Examiner*—Suzanne Dino Barrett
(74) *Attorney, Agent, or Firm*—Birch, Stewart, Kolasch & Birch, LLP (57) ABSTRACT

To provide a key cylinder device equipped with a handle lock mechanism which can maintain a handle lock mechanism of a key cylinder unit with a shutter to provide an improved assembleability of the key cylinder device. The bolts for fixing a shutter housing are attached from the back surface of the top plate of an inverted angular U-shaped bracket. Thus, even when a gap is generated between the shutter housing and a vehicle body cover, the bolts are not exposed and hence cannot be easily loosened. In addition, by mounting the key cylinder device in the vehicle body cover and then mounting the vehicle body cover thereon, assembleability can be improved.

27 Claims, 6 Drawing Sheets

VEHICLE PROVIDED WITH KEY CYLINDER DEVICE EQUIPPED WITH HANDLE LOCK MECHANISM

CROSS-REFERENCE TO RELATED APPLICATIONS

The present application is related to Japanese Patent Application No. 2003-209733 filed on Aug. 29, 2003 the entire contents of which are hereby incorporated by reference.

BACKGROUND OF THE INVENTION

1. Field of the Invention

The present invention relates to an improved key cylinder device equipped with a handle lock mechanism suitable for a motorcycle.

2. Description of the Background Art

In the related art, a key cylinder device equipped with a handle lock mechanism having a shutter is proposed, for example in JP-A-11-44132, see FIG. 2.

Figure 7:
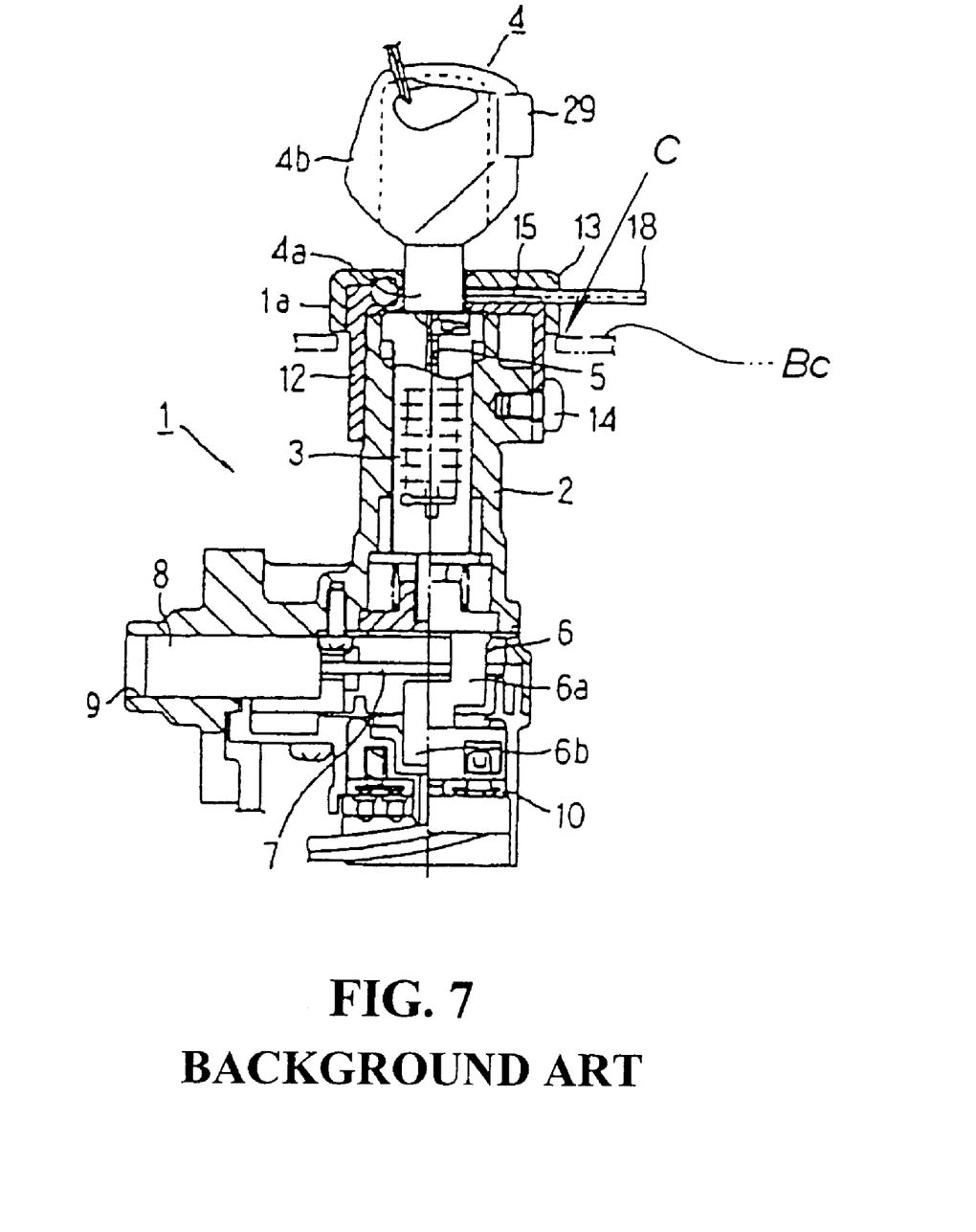
FIG. 7 corresponds to FIG. 2 in JP-A-11-44132.

FIG. 7 of the present application is a drawing corresponding to FIG. 2 in JP-A-11-44132, in which a reference symbol Bc and a reference symbol C are added.

A cylinder lock 1 has a structure including a rotor 3 rotatably stored in a cylinder body 2 with a lock bar 8 connected to a camshaft 6 at a lower part of the rotor 3. A substantially cap-shaped ring 12 is covered on the cylinder body 2 with the ring 12 being fixed to the cylinder body 2 with a screw 14. A shutter 15 is disposed on the ring 12 with the shutter 15 being covered by a cover 13. The reference numeral Bc is represented by an imaginary line for designating a vehicle body cover.

Since the screw 14 is located in the vicinity of the vehicle body cover Bc, if there is a gap between the cover 13 and the vehicle body cover Bc, the screw 14 is visible from the outside and hence there is a possibility of being tampered with. Therefore, in the related art, the mounting hole of the cylinder lock on the vehicle body cover Bc is set to be smaller than the outer diameter of the cover 13 so that the vehicle body cover Bc is overlapped within the cover 13 to eliminate the gap, and hence the screw 14 is not exposed.

However, in this arrangement, since the ring 12 that is integrally assembled to the cover 13 is fitted into the mounting hole of the vehicle body cover Bc from the outside and fixed to the cylinder body 2 provided inside the vehicle body cover Bc with the screw 14, there are problems with respect to the required accuracy of the mounting hole and the number of assembling steps for the cylinder lock increases.

SUMMARY AND OBJECTS OF THE INVENTION

Accordingly, an object of the present invention is to provide a key cylinder device equipped with a handle lock mechanism, in which the assembleability of the key cylinder device to a vehicle body frame can be improved.

In order to achieve the above-described object, a vehicle is provided with a key cylinder device equipped with a handle lock mechanism that includes a steering handle steerably attached to a vehicle body frame with a key cylinder unit attached to the vehicle body frame. A shutter housing is provided for covering a key hole of the key cylinder unit with the shutter housing being mounted to the vehicle body frame with a bracket. The key cylinder unit and the bracket are disposed in a vehicle body cover. A key cylinder device is equipped with a handle lock mechanism wherein the handle lock is actuated by extending a lock pin by operating the key cylinder unit with a key and connecting the vehicle body frame and the operating handle with the lock pin. The bracket is formed into a bracket of an inverted angular U-shape having a top plate for covering the upper surface of the key cylinder unit. Left and right legs are provided for covering the left and right side surfaces of the key cylinder unit. In addition, the shutter housing is mated with the top plate and bolts for fixing the shutter housing to the top plate are screwed from between the side surfaces of the key cylinder unit and the legs.

Since the bolts for fixing the shutter housing are attached from the back surface of the top plate of the inverted angular U-shaped bracket, even when a gap is generated between the shutter housing and the vehicle body cover, the bolts are not exposed and hence cannot be loosened easily. In addition, since the bolts are screwed from the gaps between the side surfaces of the key cylinder unit and the legs, it is difficult to loosen these bolts from the outside.

In addition, since the upper surface and the both side surfaces of the key cylinder unit are covered by the inverted angular U-shaped bracket, even when an attempt is made to insert a rod-shaped object from the outside, the rod-shaped object can hardly reach a principal portion of the key cylinder unit in view of the protecting effect of the inverted angular U-shaped bracket.

Therefore, the key cylinder device is equipped with a handle lock mechanism can hardly be tampered with and the handle lock mechanism can be maintained. Simultaneously, since the assembly can be completed simply by easily mounting the key cylinder device in the vehicle body cover and then mounting the vehicle body cover thereon, assembleability is improved.

Further, the legs are disposed so that the legs can cover the side surface of a mounting member for mounting the key cylinder unit to the vehicle body frame.

The key cylinder unit is mounted to the vehicle body with the mounting member such as a bolt. By covering the mounting member with the legs, the possibility of the rod-shaped member or the like reaching the mounting member is avoided.

The legs are disposed so that the side surface of the lock pin can be covered by the legs.

It is not preferable that the rod-shaped member inserted from the outside reaches the lock pin. Therefore, by protecting the lock pin with the legs, such a possibility is eliminated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the attached drawings, an embodiment of the preset invention will be described below.

In the present embodiment, a scooter-type vehicle will be described as an example. The vehicle, however, may be any type of two-wheeler, three-wheeler and four-wheeler vehicle as long as it has a front wheel and a rear wheel provided at the front and rear of a vehicle body frame, and a steering handle that is steerably attached to a head pipe of the vehicle body frame.

Figure 1:
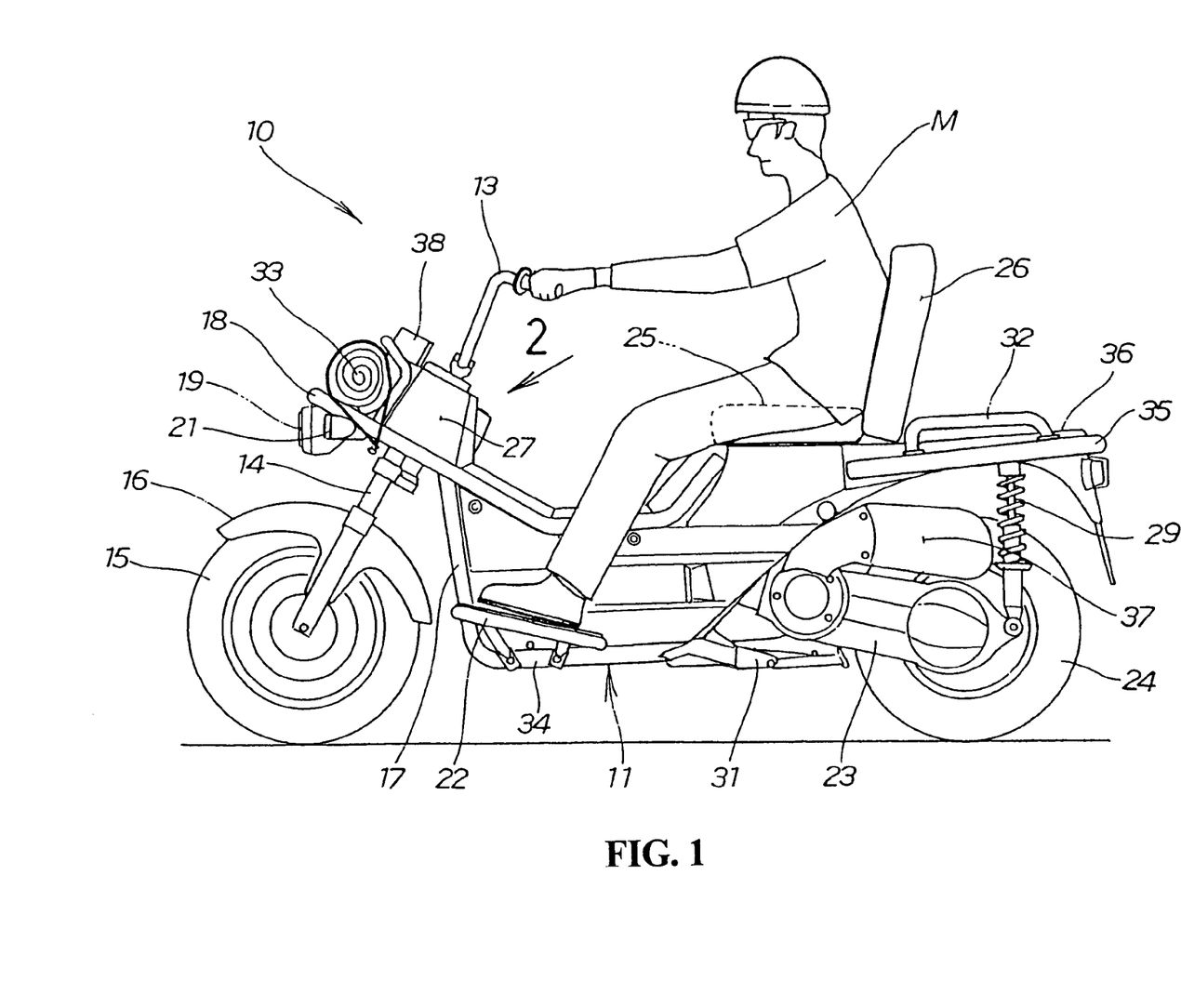
FIG. 1 is a side view of a scooter-type vehicle according to the present invention.

FIG. 1 is a side view of a scooter-type vehicle according to the present invention, in which a scooter-type vehicle 10 is a two-seater light-weight vehicle including a steering handle 13 steerably mounted at the front of a vehicle body frame 11 with a front wheel 15 and a front fender 16 mounted to a front fork 14 to be connected to the steering handle 13. A separate frame 18 is attached to the vehicle body frame 11 with a headlamp 19, turn signal lamps 21 etc. being attached to the separate frame 18. Steps 22 are attached to down tubes 17. A power unit 23 is mounted to the rear portion of the vehicle body frame 11 so as to be capable of swinging in the vertical direction with a rear wheel 24 being attached behind the power unit 23. A rider's seat 25 and a fellow passenger's seat which also serves as a seatback 26 are provided obliquely upwardly of the rear wheel 24.

In FIG. 1, a handle post cover 27 is provided that constitutes part of the vehicle body cover. A rear cushion 29 is provided together with a stand 31 and a grab rail 32.

FIG. 1 is a side view of a scooter-type vehicle according to the present invention, which is converted into a single-seater mode, illustrating that a fellow passenger's seat which also serves as a seatback 26 is moved upright and converted into a backrest, that is, a seatback for a rider M. FIG. 1 also shows that a load 33 such as a tent may be placed at the front of the separate frame 18.

In addition, as illustrated in FIG. 1 not only the steering handle 13 and the grab rail 32, but also the separate frame 18, the down tubes 17, lower pipes 34 extending from the down tubes 17 and a rear frame 35 are exposed.

A rear carrier 36 is provided wherein a load can be placed on the rear carrier 36 when the fellow passenger's seat which also serves as a seatback 26 is placed in the upright position. An air cleaner 37 is provided together with a meter unit 38.

In the scooter-type vehicle in the related art, it is normal to cover the vehicle body frame with a vehicle body cover, so that most of the parts of the vehicle body frame are not exposed. On the other hand, most parts of the vehicle body frame are exposed, so that a novel feature in the appearance of the scooter-type vehicle is demonstrated.

Figure 2:
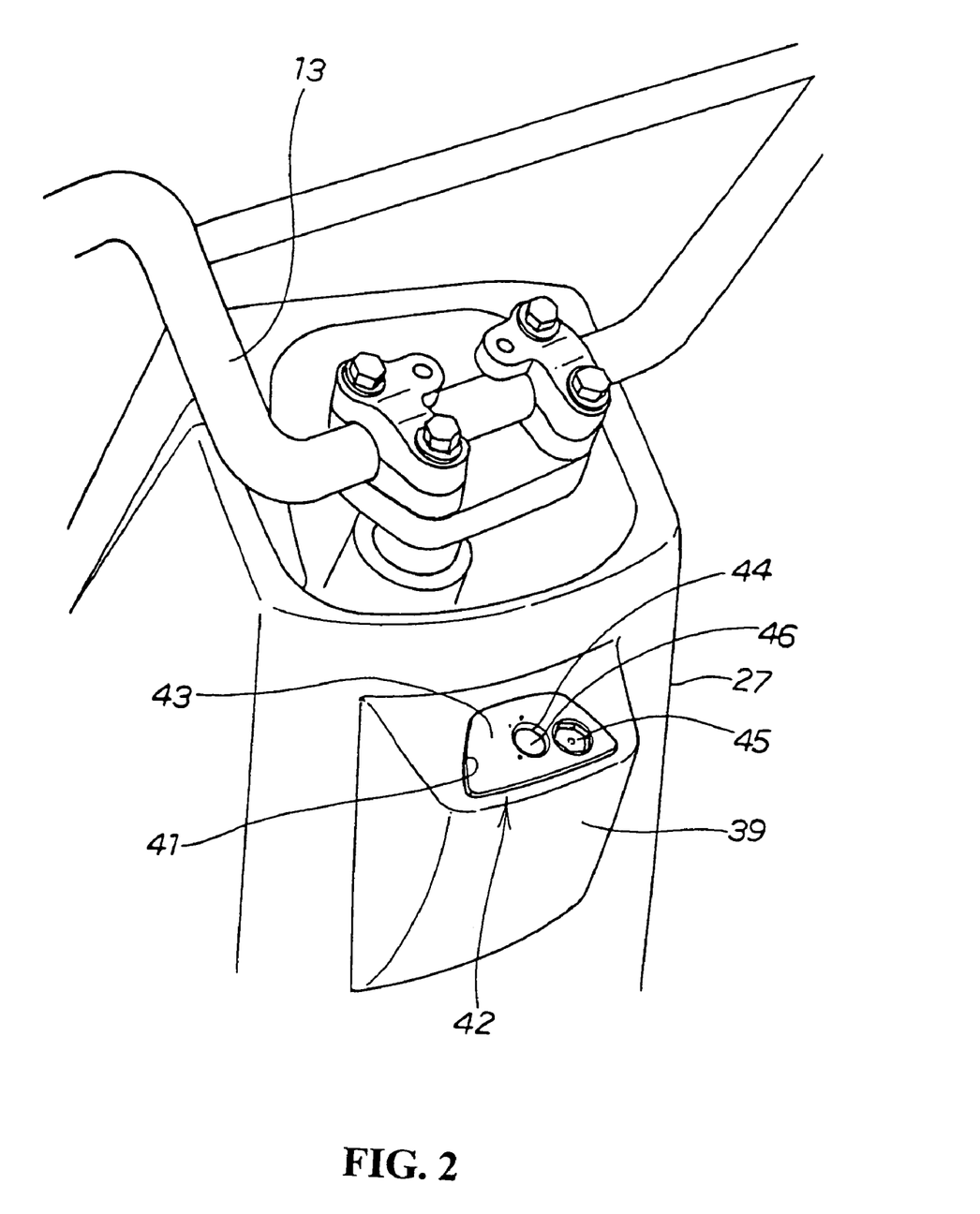
FIG. 2 is a drawing viewed in the direction of an arrow 2 in FIG. 1.

FIG. 2 is a drawing viewed in the direction indicated by an arrow 2 in FIG. 1, showing that the rear portion of the handle cover 27 constituting part of the vehicle body cover protrudes and an upper surface 43 of a shutter housing 42 is exposed from an upper opening 41 of a protruding cover portion 39. A key insertion bole 44 and a magnet touch portion 45 are provided on the upper surface 43. The key insertion hole 44 is closed by a shutter 46. When a predetermined magnet (not shown) is touched to the magnet touch portion 45, the shutter 46 opens and hence the key can be inserted into the key insertion hole 44.

Subsequently, a key cylinder device equipped with a handle lock mechanism integrated in the protruded cover portion 39 and the handle cover 27 will be described below.

Figure 3:
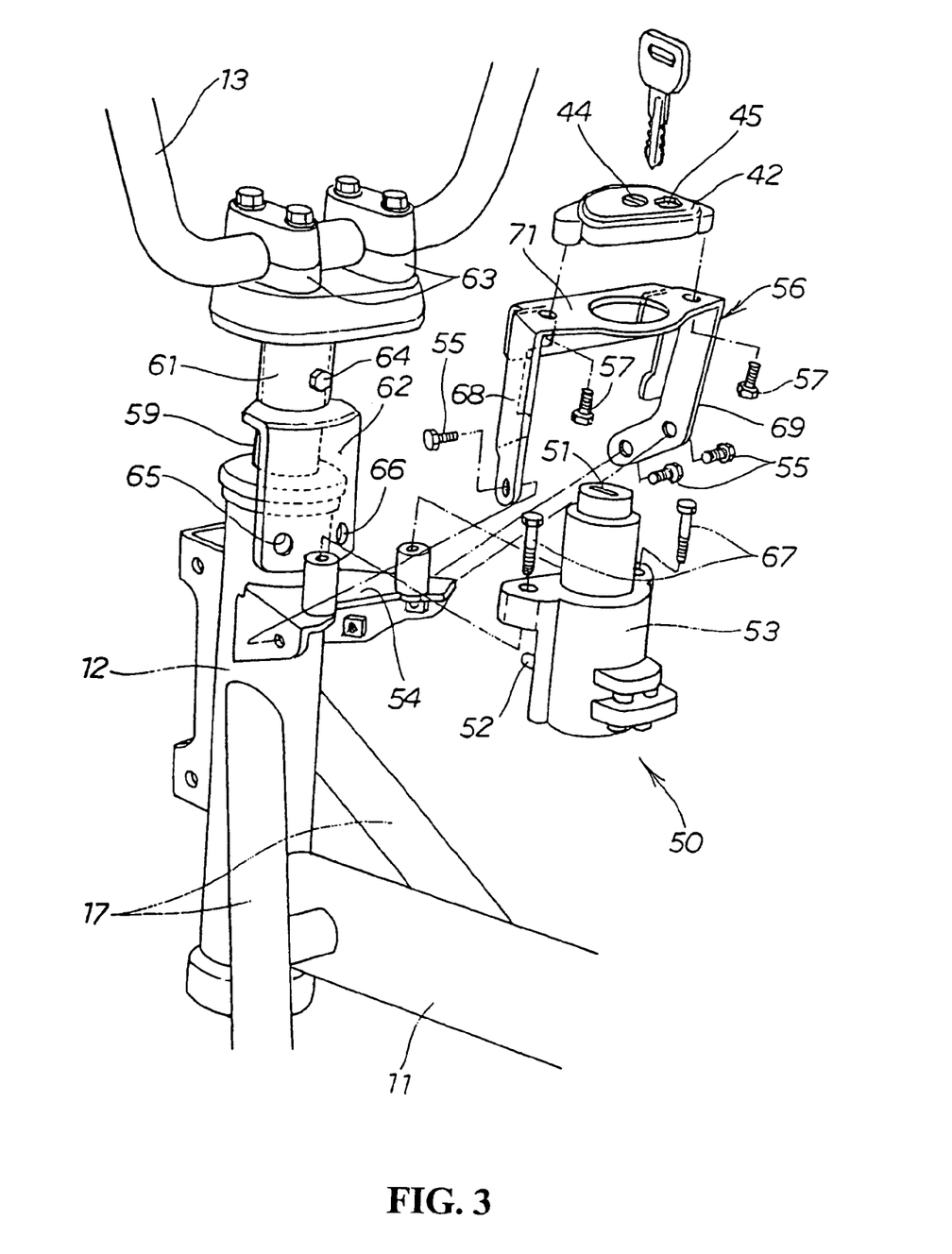
FIG. 3 is an exploded perspective view of a key cylinder device equipped with a handle lock mechanism according to the present invention.

FIG. 3 is an exploded perspective view of the key cylinder device equipped with a handle lock mechanism according to the present invention, in which a key cylinder device is equipped with a handle lock mechanism 50 (hereinafter referred to as "key cylinder device 50") that includes a key hole 51, switches (not shown since they are built-in), a key cylinder unit 53 provided with a pin-popup mechanism for rising and setting a lock pin 52 (not shown since it is built-in), a unit supporting bracket 54 for mounting the key cylinder unit 53 to the head pipe 12 and an inverted angular U-shaped bracket 56 to be fixed to the unit supporting bracket 54 with three screws 55 . . . ( . . . means a plurality of units, hereinafter). The shutter housing 42 is fixed to the inverted angular U-shaped bracket 56 by bolts 57, 57 screwed from below and a lock plate 62 welded and fixed to a sleeve 61 fitted to a steering shaft 59.

The sleeve 61 is a hand-holder-integrated sleeve integrally provided with handle-holder halves 63, 63. The operation of the handle 13 can be transmitted to the steering shaft 59 by fastening it to the steering shaft 59 with a lock bolt 64.

Two lock holes 65, 66 are formed on the lock plate 62. Since the head pipe 12 is non-rotational member, and the sleeve 61 on the steering shaft 59 is a rotational member, the handle 13 can be locked by engaging with the steering shaft 59 on the head pipe 12. The key cylinder device 50 according to the present invention is based on this principle.

In order to achieve the above-described principle, the key cylinder unit 53 is fixed to the unit supporting bracket 54 provided on the backside of the head pipe 12 with bolts 67, 67 and the inverted angular U-shaped bracket 56 is attached to the key cylinder 53 so as to provide a cover thereon. The shutter housing 42 is preferably secured to the inverted angular U-shaped bracket 56 with a bolt in advance.

Figure 4:
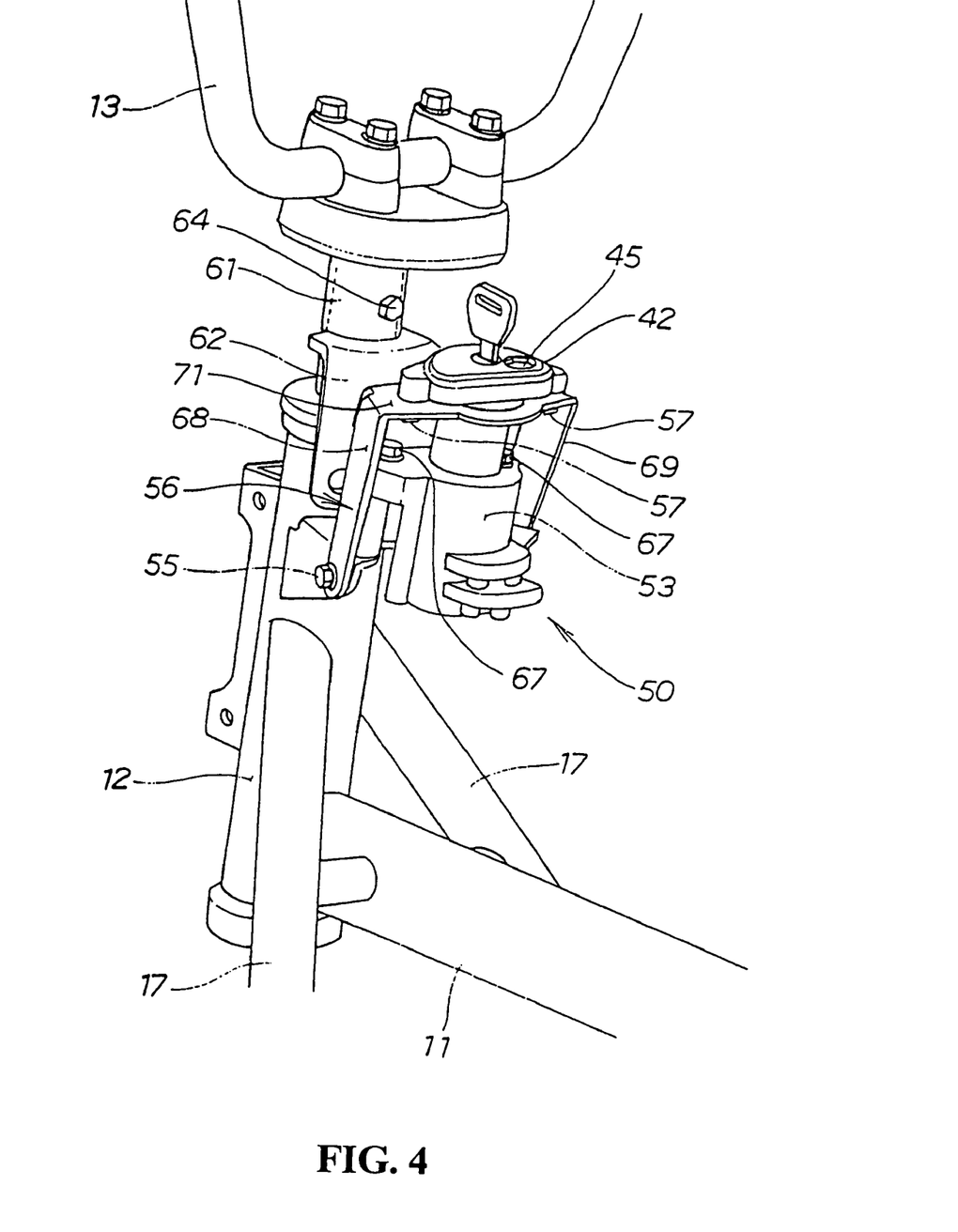
FIG. 4 is a perspective view of a key cylinder device according to the present invention.

FIG. 4 is a perspective view of the key cylinder device according to the present invention, in which the inverted angular U-shaped bracket 56 is a supporting fixture including left and right legs 68, 69 and a top plate 71 connecting the upper ends thereof and formed laterally into an inverted angular U-shape. The top plate 71 covers the upper surface of the key cylinder unit 53. The left and right legs 68, 69 are formed into the shape and size so as to be capable of covering both side surfaces of the key cylinder unit 53.

In addition, the shutter housing 42 is fixed to the top plate 71 by placing the shutter housing 42 on the top plate 71 of the inverted angular U-shaped bracket 56, inserting the bolts 57, 57 from below and screwing into the top plate 71. In other words, the bolts 57, 57 are inserted upwardly from below the top plate 71 through the gaps formed between the side surfaces of the key cylinder unit 53 and the legs 68, 69.

As described in conjunction with FIG. 2, since the shutter housing 42 is disposed in such a manner that only the upper surface thereof is exposed from the vehicle body cover (protruded cover portion 39), the bolts are not exposed.

Thus, assembly is completed only by easily mounting the key cylinder device to the vehicle body frame and then mounting the vehicle cover thereon. Therefore, the assembleability is improved.

Also, as shown in FIG. 4, in the present invention, since the upper surface and both side surfaces of the key cylinder unit 53 are covered by the inverted angular U-shaped bracket 56, even when the rod-shaped member is inserted from the outside, the possibility that the rod-shaped member reaches the principal portion of the key cylinder unit 53 is eliminated by the protecting effect of the inverted angular U-shaped bracket 56.

In addition, since the bolts 57, 57 for fixing the shutter housing 42 are attached from the back surface of the top plate 71 of the inverted angular U-shaped bracket 56, the bolts 57, 57 cannot be easily loosened. Furthermore, the bolts 57, 57 are screwed from the gaps formed between the side surfaces of the key cylinder unit 53 and the legs 68, 69. Therefore, it is difficult to loosen the bolts 57, 57 from the outside.

Figure 5:
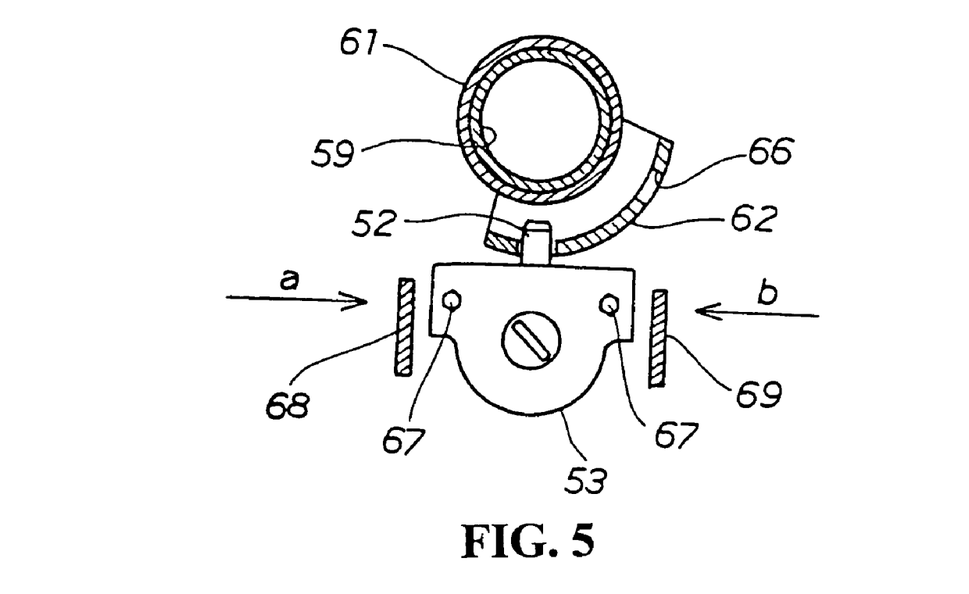
FIG. 5 is a drawing showing an example of a modification, cross-sectional plan view, of an inverted angular U-shaped frame according to the present invention.

FIG. 5 is a drawing showing an example of a modification, cross-sectional plan view, of the inverted angular U-shaped frame according to the present invention wherein the legs 68, 69 are disposed so that the legs 68, 69 can cover the side surfaces of the mounting members (the bolts 67, 67 in the embodiment) for mounting the key cylinder unit 53 to the vehicle body frame.

As shown by arrows a, b, when the rod-shaped member is inserted laterally from the outside, the legs 68, 69 serve as a protecting member. Thus, the possibility that the extremity of the rod-shaped member reaches the bolts 67, 67 can be eliminated.

Figure 6:
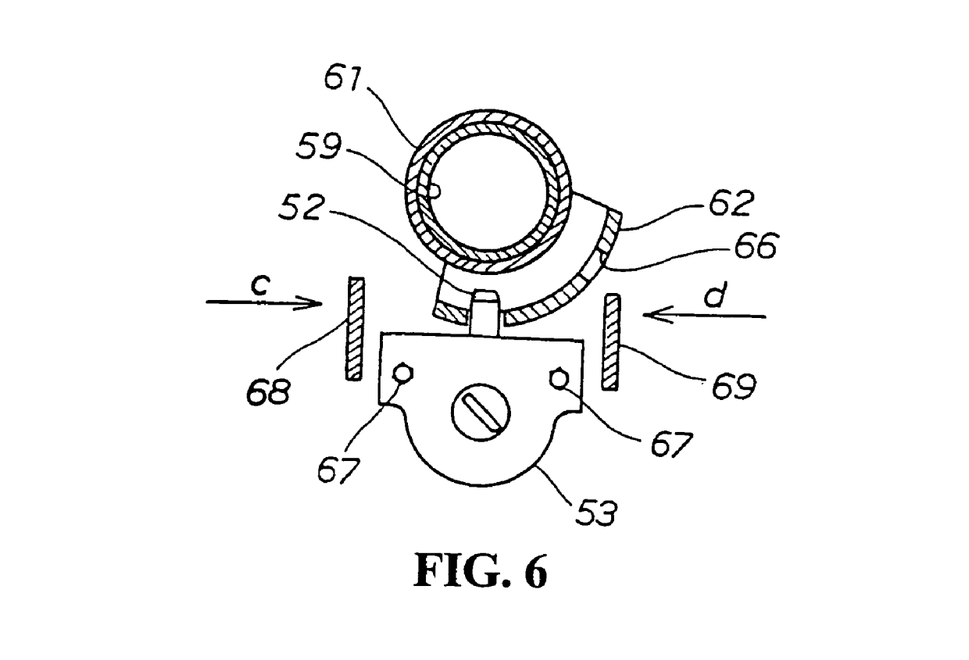
FIG. 6 is a drawing showing another example of a modification, cross-sectional plan view, of the inverted angular U-shaped frame according to the present invention.

FIG. 6 is a drawing showing another example of a modification, cross-sectional plan view, of the inverted angular U-shaped frame according to the present invention wherein the legs 68, 69 are disposed so as to cover the side surfaces of the lock pin 52 by the legs 68, 69.

It is not preferable that the inserted rod-shaped member reaches the lock pin 52 as shown by arrows c, d. Therefore, by protecting the lock pin 52 with the legs 68, 69, such a possibility is eliminated.

The mounting member of the present invention may simply be a member that can mount the key cylinder unit to the vehicle body frame. The mounting member may be of any type as long as it is a bolt, nut, clamping mechanism, or equivalent tightening member.

With the arrangement described above, the present invention demonstrates the following effects.

In the present invention the bolts for fixing the shutter housing are attached from the back surface of the top plate of the inverted angular U-shaped bracket, even when a gap is generated between the shutter housing and the vehicle body cover, the bolts are not exposed and hence cannot be loosened easily. In addition, since the bolts are screwed from the gaps between the side surfaces of the key cylinder unit and the legs, it is difficult to loosen these bolts from the outside.

Also, since the upper surface and both side surfaces of the key cylinder unit are covered by the inverted angular U-shaped bracket, even when the rod-shaped member is inserted from the outside, the possibility that the rod-shaped member reaches the principal portion of the key cylinder unit is eliminated by the protecting effect of the inverted angular U-shaped bracket.

Therefore, according to the present invention, the key cylinder device equipped with a handle lock mechanism can hardly be tampered with and the handle lock mechanism can be maintained. Simultaneously, since the assembly can be completed simply by easily mounting the key cylinder device in the vehicle body cover and then mounting the vehicle body cover thereon, the assembleability is improved.

The present invention provides legs that are disposed so that the legs can cover the side surface of a mounting member for mounting the key cylinder unit to the vehicle body frame.

The key cylinder unit is mounted to the vehicle body with a mounting member such as a bolt. By covering the mounting member with the legs, the possibility that the rod-shaped member reaches the mounting member may be avoided.

The present invention provides legs that are disposed so that the side surfaces of the lock pin can be covered by the legs.

It is not preferable that the rod-shaped member inserted from the outside reaches the lock pin. Therefore, by protecting the lock pin with the legs, the possibility thereof is eliminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle provided with a key cylinder device equipped with a handle lock mechanism comprising:
    a steering handle steerably attached to a vehicle body frame;
    a key cylinder unit attached to the vehicle body frame near the steering handle;
    a shutter housing for covering a key hole of the key cylinder unit, said shutter housing being mounted to the vehicle body frame with a bracket and the key cylinder unit and the bracket being disposed in a vehicle body cover;
    wherein the key cylinder device equipped with a handle lock mechanism is actuated by extending a lock pin by operating the key cylinder unit with a key and connecting the vehicle body frame and the steering handle with the lock, and
    wherein the bracket is formed into a bracket of an inverted angular U-shape having a top plate for covering an upper surface of the key cylinder unit, left and right plate-shaped legs extending downwardly for covering left and right side surfaces of the key cylinder unit, and
    said shutter housing being fixed to an upper surface of the top plate and upwardly extending bolts for fixing the shutter housing to the top plate are screwed from between the side surfaces of the key cylinder unit and the legs.

2. The vehicle provided with a key cylinder device having a handle lock mechanism according to claim 1, wherein the legs are disposed so that the legs can cover sides surfaces of a mounting member for mounting the key cylinder unit to the vehicle body frame.

3. The vehicle provided with a key cylinder device equipped with a handle lock mechanism according to claim 1, wherein the legs are disposed so that side surfaces of the lock pin can be covered by the legs.

4. The vehicle provided with a key cylinder device equipped with a handle lock mechanism according to claim 1, wherein the vehicle body frame includes a unit supporting bracket extending rearwardly from the head pipe,
    wherein the left and right legs are attached to right and left vertical sides surfaces of the unit supporting bracket by bolts extending laterally in a direction orthogonal to an axis of the key cylinder unit, and wherein the key cylinder unit is attached to an upper part of the unit supporting bracket by bolts extending downwardly and parallel to the axis of the key cylinder unit.

5. The vehicle provided with a key cylinder device equipped with a handle lock mechanism according to claim 1, wherein the left leg, the top plate and the right leg form a unitary inverted angular U-shape.

6. The vehicle provided with a key cylinder device equipped with a handle lock mechanism according to claim 1, and further including an arc-shaped lock plate secured to said steering handle, wherein said lock pin is engaged within an aperture in said lock plate for locking the steering handle relative to the vehicle body frame.

7. The vehicle provided with a key cylinder device equipped with a handle lock mechanism according to claim 1, and further including magnet touch portion formed in the shutter housing, wherein touching the magnet touch portion with a predetermined magnet opens a shutter in said shutter housing for permitting access to said key hole.

8. The vehicle provided with a key cylinder device equipped with a handle lock mechanism according to claim 1, wherein the key cylinder unit is attached to a rear side of a head pipe, and has an axial direction extending parallel to an axial direction of the head pipe.

9. The vehicle provided with a key cylinder device equipped with a handle lock mechanism according to claim 1, wherein left and right plate-shaped legs extend in a direction parallel to each other.

10. A vehicle provided with a key cylinder device equipped with a handle lock mechanism comprising:

a steering handle steerably attached to a vehicle body frame;

a key cylinder unit attached to the vehicle body frame near the steering handle;

a shutter housing being mounted to the vehicle body frame for covering a key hole of the key cylinder unit;

a lock pin actuated by operating the key cylinder unit with a key and connecting the vehicle body frame and the steering handle with the lock pin for locking the steering handle; and a bracket includes a top plate for covering an upper surface of the key cylinder unit, left and right legs for covering the left and right side surfaces of the key cylinder unit, the left and right legs being attached to right and left vertical sides surfaces of the vehicle body frame by bolts extending laterally with respect to the vehicle body frame, said shutter housing being fixed to an upper surface of the top plate with bolts extending upwardly from beneath the top plate.

11. The vehicle provided with a key cylinder device having a handle lock mechanism according to claim 10, wherein the legs extend downwardly and are disposed so that the legs can cover side surfaces of a mounting member for mounting the key cylinder unit to the vehicle body frame.

12. The vehicle provided with a key cylinder device equipped with a handle lock mechanism according to claim 10, wherein the legs are disposed so that side surfaces of the lock pin can be covered by the legs.

13. The vehicle provided with a key cylinder device equipped with a handle lock mechanism according to claim 10, wherein the vehicle body frame includes a unit supporting bracket extending rearwardly from the head pipe, wherein the left and right legs are attached to right and left vertical sides surfaces of the unit supporting bracket of the vehicle body frame by the bolts extending laterally with respect to the vehicle body frame, and wherein the key cylinder unit is attached to an upper part of the unit supporting bracket by bolts extending downwardly and parallel to the axis of the key cylinder unit.

14. The vehicle provided with a key cylinder device equipped with a handle lock mechanism according to claim 10, wherein the left leg, the top plate and the right leg form a unitary inverted angular U-shape.

15. The vehicle provided with a key cylinder device equipped with a handle lock mechanism according to claim 10, and further including a lock plate secured to said steering handle wherein said lock pin is engaged within an aperture in said lock plate for locking the steering handle relative to the vehicle body frame.

16. The vehicle provided with a key cylinder device equipped with a handle lock mechanism according to claim 10, and further including a magnet touch portion wherein touching the magnet touch portion with a predetermined magnet opens a shutter in said shutter housing for permitting access to said key hole.

17. The vehicle provided with a key cylinder device equipped with a handle lock mechanism according to claim 10, wherein the key cylinder unit is attached to a rear side of a head pipe, and has an axial direction extending parallel to an axial direction of the head pipe.

18. The vehicle provided with a key cylinder device equipped with a handle lock mechanism according to claim 10, further comprising a unit supporting bracket extending from a back side of the head pipe, the unit supporting bracket having flat right and left side surfaces, wherein the left and right legs are attached to the flat right and left surfaces of the unit supporting bracket.

19. A handle lock mechanism adapted to be used with a vehicle comprising:

a steering handle adapted to be rotatably attached to a vehicle body frame;

a key cylinder unit adapted to be attached to the vehicle body frame near the steering handle;

a shutter housing being mounted to the vehicle body frame for covering a key hole of the key cylinder unit; and a lock pin actuated by operating the key cylinder unit with a key and connecting the vehicle body frame and the steering handle with the lock pin for locking the steering handle;

wherein a bracket includes a top plate for covering an upper surface of the key cylinder unit, left and right legs for covering the left and right side surfaces of the key cylinder unit and said shutter housing being fixed to an upper surface of the top plate with bolts extending upwardly from beneath the top plate, and wherein said left and right legs extend in a direction that is substantially orthogonal to a flat surface of the top plate.

20. The handle lock mechanism adapted to be used with a vehicle according to claim 19, wherein the legs extend downwardly and are disposed so that the legs can cover side surfaces of a mounting member for mounting the key cylinder unit to the vehicle body frame.

21. The handle lock mechanism adapted to be used with a vehicle according to claim 19, wherein the legs are disposed so that side surfaces of the lock pin can be covered by the legs.

22. The handle lock mechanism adapted to be used with a vehicle according to claim 19, wherein the vehicle body frame includes a unit supporting bracket extending rearwardly from the head pipe, wherein the left and right legs are attached to right and left vertical sides surfaces of the unit supporting bracket of the vehicle body frame by the bolts extending laterally with respect to the vehicle body frame, and wherein the key cylinder unit is attached to an upper part of the unit supporting bracket by bolts extending downwardly and parallel to the axis of the key cylinder unit.

23. The handle lock mechanism adapted to be used with a vehicle according to claim 19, wherein the left leg, the top plate and the right leg form a unitary inverted angular U-shape.

24. The handle lock mechanism adapted to be used with a vehicle according to claim 19, and further including a lock plate secured to said steering handle wherein said lock pin is engaged within an aperture in said lock plate for locking the steering handle relative to the vehicle body frame.

25. The handle lock mechanism adapted to be used with a vehicle according to claim 19, wherein the key cylinder unit is attached to a rear side of a head pipe, and has an axial direction extending parallel to an axial direction of the head pipe.

26. The handle lock mechanism adapted to be used with a vehicle according to claim 19, wherein threaded portions of the bolts extending upwardly for fixing the shutter to the top plate extend upwardly in a direction substantially parallel to an axis of a vehicle head pipe.

27. The handle lock mechanism adapted to be used with a vehicle according to claim 19, wherein the bolts extending upwardly for fixing the shutter to the top plate are covered by the shutter and are not exposed from outside of the handle lock mechanism.

* * * * *